US008060919B2

(12) United States Patent
Andrasak et al.

(10) Patent No.: US 8,060,919 B2
(45) Date of Patent: Nov. 15, 2011

(54) AUTOMATED PASSWORD TOOL AND METHOD OF USE

(75) Inventors: Michael J. Andrasak, Red Hook, NY (US); Catherine G. Bala, LaGrangeville, NY (US); Anthony J. Becampis, Wirtz, VA (US); Zho Bin Cong, Dalian (CN); Gina Mazzarelli, New Windsor, NY (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 11/830,329

(22) Filed: Jul. 30, 2007

(65) Prior Publication Data

US 2009/0037984 A1 Feb. 5, 2009

(51) Int. Cl.
*G06F 21/00* (2006.01)
*H04L 29/06* (2006.01)
*G06F 15/173* (2006.01)

(52) U.S. Cl. .................. 726/6; 726/7; 726/18; 726/19; 713/183; 713/184

(58) Field of Classification Search ............... 726/5–6; 713/183
See application file for complete search history.

(56) References Cited

U.S. PATENT DOCUMENTS

| | | | | |
|---|---|---|---|---|
| 5,592,553 | A * | 1/1997 | Guski et al. | 713/159 |
| 5,826,016 | A * | 10/1998 | Ito et al. | 726/18 |
| 6,240,184 | B1 | 5/2001 | Huynh et al. | |
| 6,453,352 | B1 * | 9/2002 | Wagner et al. | 709/229 |
| 6,496,937 | B1 | 12/2002 | Ichihara | |
| 6,564,232 | B1 * | 5/2003 | Cole et al. | 1/1 |
| 6,996,718 | B1 | 2/2006 | Henry et al. | |
| 7,114,075 | B1 * | 9/2006 | Yasuda et al. | 713/182 |
| 7,194,761 | B1 * | 3/2007 | Champagne | 726/6 |

(Continued)

FOREIGN PATENT DOCUMENTS

| | | | |
|---|---|---|---|
| JP | 2006011894 | | 1/2006 |
| KR | 2002032892 A | * | 5/2002 |

OTHER PUBLICATIONS

M. Bishop, "Anatomy of a Proactive Password Checker," Proceedings of the UNIX Security Symposium, pp. 130-139 (Sep. 1992).*
UbiData: Requirements and Architecture for Ubiquitous Data Access, SIGMOD Record, vol. 33, No. 4, Dec. 2004—Helal, A. et al.
A Model of OASIS Role-Based Access Control and Its Support for Active Security; ACM Transactions on Info. and System Security, vol. 5, No. 4, Nov. 2002, pp. 492-540.

(Continued)

*Primary Examiner* — Gilberto Barron, Jr.
*Assistant Examiner* — Carolyn B Kosowski
(74) *Attorney, Agent, or Firm* — Anna L. Linne; Roberts Mlotkowski Safran & Cole, P.C.

(57) ABSTRACT

A method of auto updating a password comprises opening a password file and a new password file and reading information from the password file including user ID type. The method applies the user ID type to a predetermined application type and executes password-updating logic to generate a new password for the application type. The method further updates the new password file with the new password for the predetermined application type. A system comprises at least one of a hardware component and a software component configured to read information from a password file including user ID type. The hardware component and/or software component is further configured to determine that the user ID type matches to an application type and to apply the user ID type to the matched application type. The hardware component and/or software component is further configured to generate a new password for the application type and to update the password file with the new password for the application type.

48 Claims, 7 Drawing Sheets

U.S. PATENT DOCUMENTS

| | | | |
|---|---|---|---|
| 7,249,261 B2* | 7/2007 | Charbonneau | 713/184 |
| 7,272,722 B2* | 9/2007 | Legros et al. | 713/183 |
| 2003/0154403 A1* | 8/2003 | Keinsley et al. | 713/201 |
| 2004/0128551 A1* | 7/2004 | Walker et al. | 713/201 |
| 2005/0005132 A1* | 1/2005 | Yantzi | 713/184 |
| 2007/0094710 A1* | 4/2007 | Walker et al. | 726/2 |
| 2010/0031331 A1* | 2/2010 | Ichinose et al. | 726/6 |
| 2010/0199347 A1* | 8/2010 | Aoki et al. | 726/17 |

OTHER PUBLICATIONS

Tenth USENIX System Administration Conference (LISA X), Chicago, IL, USA, Sep. 29-Oct. 4, 1996, "Shuse: Multi-Host Account Administration", Henry Spencer, SP Systems (with Abstract).

Automated Logical Access Control Standard—Symons, CR. et al.; Jul. 1984; p. 17-23.

InterViso: Dealing With the Complexity of Federated Database Access; VLDB Journal, 4, 287-317 (1995), Templeton, M. et al.

* cited by examiner

US 8,060,919 B2

AUTOMATED PASSWORD TOOL AND METHOD OF USE

FIELD OF THE INVENTION

The invention relates to a system and method of automating password update functions for applications and, more particularly, a tool for automatically updating and managing password files for various applications.

BACKGROUND OF THE INVENTION

The management and maintenance of passwords for hundreds or even thousands of user ids in various development, function test Acceptance Test User (UAT) and production environments for both IBM® AIX® and MVS™ operating systems is burdensome to say the least. (IBM® AIX® and MVS™ are trademarks of International Business Machines Corp. in the United States, other countries, or both.) Regardless of the fact that this is currently a manual operation process that is executed by support personnel, it is an essential and critical function since software security, amongst other things, is of paramount importance. Without proper password maintenance and management, for example, an application would not be able to execute, thus fundamentally and financially affecting an application customer.

By way of example, in current technologies, in addition to other tasks, support personnel maintain passwords for various different applications by manually allocating a number of user ids and passwords. Depending on the specific requirements, passwords may have to be changed as frequently as on a monthly basis. In addition, this same process may have to be repeated for each instance of the application. This is very time consuming and prone to errors and application downtime.

Along with changing passwords often other actions are required to allow the new password to take effect, all of which require a tremendous amount of overhead and resources. For example, when changing the password for a Strategic Client Planning System (SCPS) factory ("factory") userid, an .lwprofile must be updated with the new password. To do this, the factory must be shut down, and the factory software must be recycled and restarted. This is a tedious task and due to the fact that the factory has to be shutdown tends to be very costly to the customer. That is, all operations associated with the factory have to be stopped, taken off-line and thus idled until a new password is generated, encoded within the application, and saved in a password file.

Accordingly, there exists a need in the art to overcome the deficiencies and limitations described hereinabove.

SUMMARY OF THE INVENTION

In a first aspect of the invention, a method of auto updating a password comprises opening a password file and a new password file and reading information from the password file including user ID type. The method applies the user ID type to a predetermined application type and executes password-updating logic to generate a new password for the application type. The method further updates the new password file with the new password for the predetermined application type.

In another aspect of the invention, a method for deploying an application for updating passwords includes providing a computer infrastructure operable to perform the following functions:
 read information from a password file including user ID type;
 apply the user ID type to a matched application type;
 generate a new password for the application type;
 update a server with the new password for a user ID; and
 update the new password file with the new password for the predetermined application type.

A system comprises at least one of a hardware component and a software component configured to read information from a password file including user ID type. The hardware component and/or software component is further configured to determine that the user ID type matches to an application type and to apply the user ID type to the matched application type. The hardware component and/or software component is further configured to generate a new password for the application type; update data on a server with the new password for a user ID; and to update the new password file with the new password for the application type.

In still another aspect of the invention, a computer program product comprises a computer usable medium having readable program code embodied in the medium. The computer program product includes at least one component to:
 open a password file and a new password file;
 read information from the password file including user ID type;
 apply the user ID type to a predetermined application type;
 execute password updating logic to generate a new password for the application type;
 update data on a server with the new password for a user ID; and
 update the new password file with the new password for the application type.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The tool of the present invention simulates manual TELNET operations, with coding and automatic updating of passwords, password logs, factory tasks (e.g., shutting down and restarting operations, updating files, etc), and the like. In this manner, the librarian does not interfere with processes of the application. The tool uses TELNET to connect to the various systems in question, such as the various development, function test, UAT and production environments for both AIX and MVS systems. AIX (Advanced Interactive executive) is a proprietary operating system developed by IBM that has some functionality similar to UNIX® System V. (UNIX is a registered trademark of The Open Group in the United States and throughout the world.)

In further embodiments, the password is updated at the appropriate time in the "strategy" that is required for the user ID. A new file is generated in a same format as the original password file, and is prepended with the date on which the passwords contained in it will expire. The expiration date is configurable. Both the new password file and the old password file can be encrypted. The amount of time required by the librarian, implementing the tool of the present invention, is greatly reduced. Additionally, by implementing the tool of the invention, once the password files have been generated and tested, the chances for forgetting to update the password on a user ID will be greatly reduced thus preventing production application outages.

Figure 1:
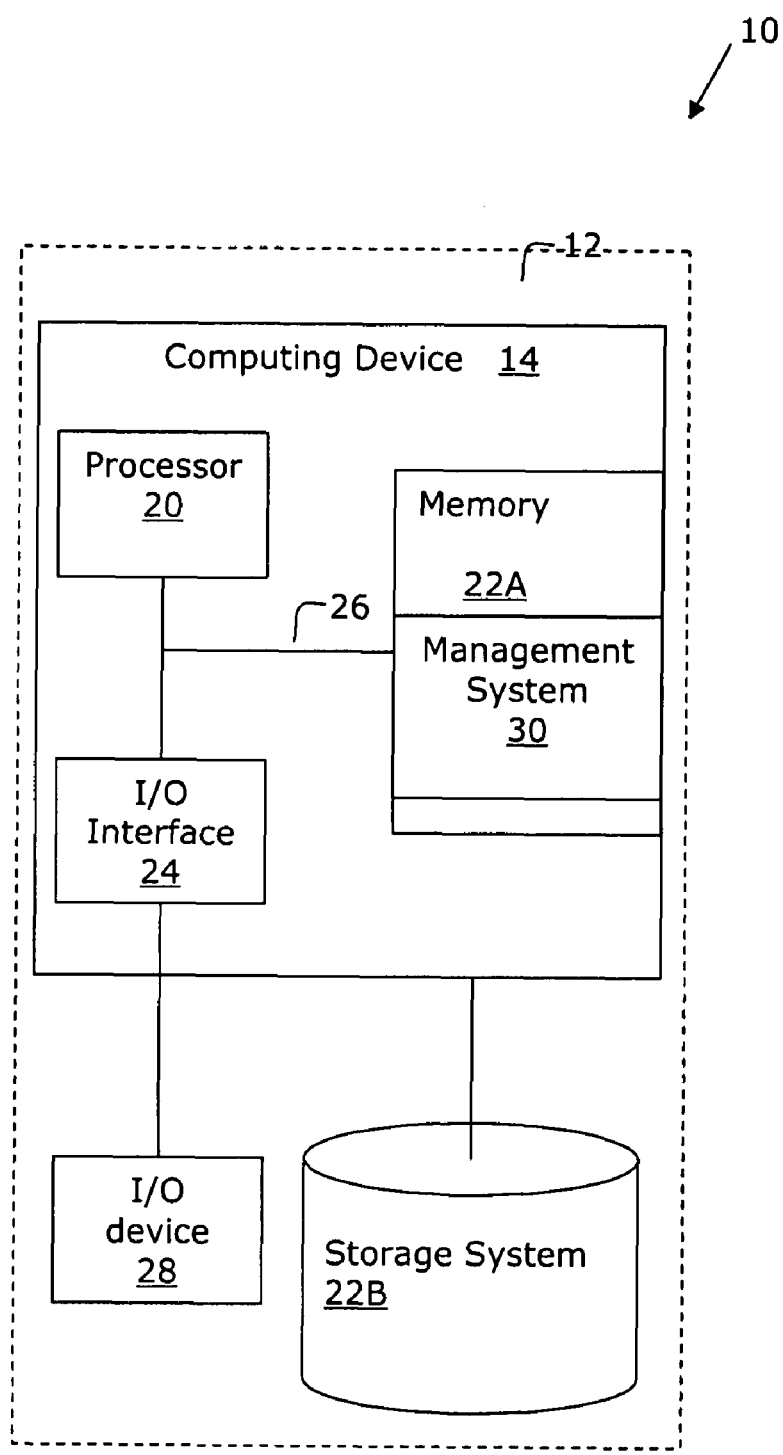
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to automate password updating in various environments, e.g., process described herein. The computing device 14 includes a processor 20, a memory 22A, an input/output (I/O) interface 24, and a bus 26. Further, the computing device 14 is in communication with an external I/O device/resource 28 and a storage system 22B.

In general, the processor 20 executes computer program code, which is stored in memory 22A and/or storage system 22B. While executing computer program code, the processor 20 can read and/or write data to/from memory 22A, storage system 22B, and/or I/O interface 24. The memory can include local memory employed during actual execution of program code, bulk storage, and cache memories, which provide temporary storage of at least some program code in order to reduce the number of times, code must be retrieved from bulk storage during execution.

The bus 26 provides a communications link between each of the components in the computing device 14. The I/O device 28 can comprise any device that enables an individual to interact with the computing device 14 or any device that enables the computing device 14 to communicate with one or more other computing devices using any type of communications link. The input/output or I/O devices (including but not limited to keyboards, displays, pointing devices, etc.) can be coupled to the system either directly or through intervening I/O controllers.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. Network adapters may also be coupled to the system to enable the data processing system to become coupled to other data processing systems or remote printers or storage devices through intervening private or public networks. Modems, cable modem and Ethernet cards are just a few of the currently available types of network adapters.

File System Architecture

Figure 2:
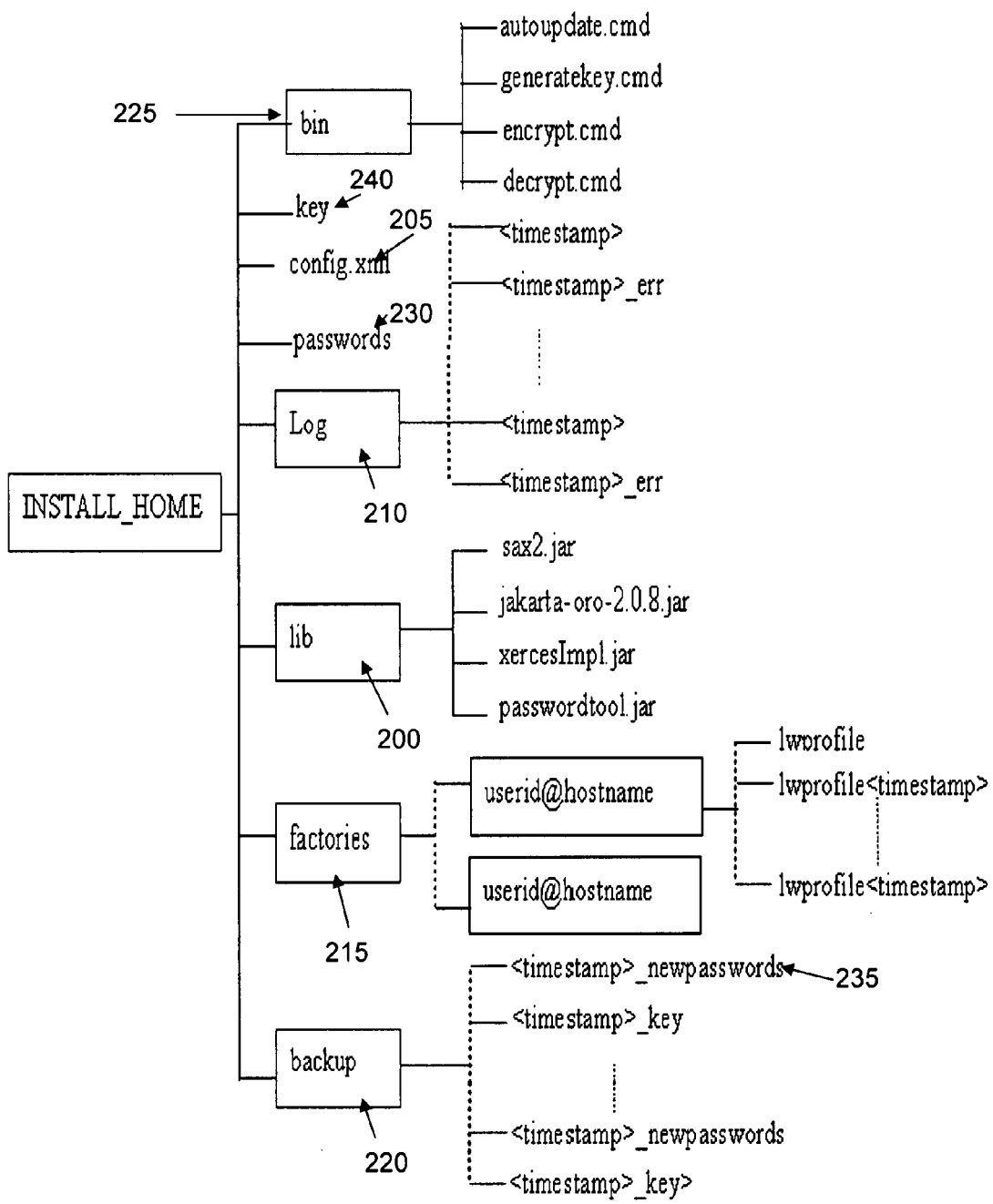
FIG. 2 shows a file system architecture in accordance with the invention.

FIG. 2 shows a file system architecture in accordance with the invention. The file system architecture includes the following elements:

Lib Directory, 200;
Configuration File (Config.Xml), 205;
Log Directory, 210;
Factories Directory, 215;
Backup Directory, 220;
Bin Directory, 225;
Input File (Old Password File), 230;
Output File (New Password File) 235; and
Key File, 240.
Lib Directory (200)
The LIB directory 200 contains jar files (JAVA/Archive files) to run the application of the present invention. For example, "Sax2.jar" and "xercesimpl.jar" are xml parser implementations, which are used to read the xml format.

Configuration File (Config.Xml) (205)

In embodiments, the configuration file contains the configuration information and part of business logic in xml format, the latter of which is discussed with reference to FIG. 7.

In embodiments, "jakarta-oro-2.0.8.jar" is used by a communication layer (discussed below) to process text data. In further embodiments, "passwordtool.jar" is the main library used to implement the main logic of password updating logic. Further details of the configuration file are described with reference to Table 1, using tag names and accompanying functions. The tag names are arbitrary names used for purposes of this disclosure and should not be considered limiting features. The functions, where necessary for a complete understanding of the invention are discussed in the flow diagrams below. Accordingly, the functions described herein should be read in context with the accompanying flow diagrams.

TABLE 1

| TAG NAME | FUNCTION |
|---|---|
| <PWDTool_config> | This is the root node of the configuration file. |
| <unix_config> | This is the root node of the unix configuration block. |

TABLE 1-continued

| TAG NAME | FUNCTION |
| --- | --- |
| <param name="param_UNIXFLAG"> | This node specifies the flag of general UNIX run type in the input and output files. |
| <command name="cmd_CHNGPROMPT"> | This node specifies the command to change the command line prompt. |
| <command name="cmd_PASSWD"> | This node specifies the change password command. |
| <message name="msg_NPASSWORDAGAIN"> | This node specifies the return message from UNIX when prompted to enter the new password again. |
| <message name="msg_LOGID"> | This node specifies the return message from UNIX when prompted to enter the user id to login. |
| <message name="msg_PASSWORD"> | This node specifies the return message from UNIX when it prompts to enter the password to login. |
| <message name="msg_INVALLOG"> | This node specifies the return message from UNIX when the login is failed because of the wrong user name or password. |
| <message name="msg_MNYLOG"> | This node specifies the return message from UNIX when the login is failed more then three times. |
| <message name="msg_PROMPT"> | This node specifies the UNIX command line prompt sign. |
| <message name="msg_OPASSWORD"> | This node specifies the return message from UNIX when prompted to enter the old password. |
| <message name="msg_NPASSWORD"> | This node specifies the return message from UNIX when prompted to enter the new password. |
| <strategy name="stg_u_gen"> | This node specifies the java class name which implements the general UNIX operation strategy. |
| <factory_config> | This node specifies the root of UNIX factory configuration block. |
| <param name="param_FACTFLAG"> | This node specifies the flag of factory UNIX run type in the input and output files. |
| <param name="param_DESKTOPCKPOINT"> | This node specifies the check point of desktop access password in the remote .lwprofile file. |
| <param name="param_SVRCKPOINT"> | This node specifies the check point of server password in the remote .lwprofile file. |
| <param name="param_REMOTEPATH"> | This node specifies the path of .lwprofile file in the remote host. |
| <param name="param_REMOTEFNAME"> | This node specifies the name of remote file, where the default name is ".lwprofile". |
| <param name="param_LOCALFNAME"> | This node specifies the name of the local backup file for the remote file, where the default name is ".lwprofile". |
| <command name="cmd_STOPFACTORY"> | This node specifies the command to stop the factory. |
| <command name="cmd_STARTFACTORY"> | This node specifies the command to start the factory. |
| <message name="msg_STOPCKPOINT"> | This node specifies the return message from UNIX to identify the beginning to stop factory. |
| <message name="msg_FACTSTOP"> | This node specifies the return message from UNIX to identify the state of "factory is not running". |
| <message name="msg_JMSTOP"> | This node specifies the return message from UNIX to identify the state of "jobManager is not running". |
| <message name="msg_BRPSTOP"> | This node specifies the return message from UNIX to identify the state of "Brio Report Poller is not running" |
| <message name="msg_STARTCKPOINT"> | This node specifies the return message from UNIX to identify the beginning to start the factory. |
| <message name="msg_FACTSTART"> | This node specifies the return message from UNIX to identify the state of "factory is running". |
| <message name="msg_JMSTART"> | This node specifies the return message from UNIX to identify the state of "jobManager is running". |

TABLE 1-continued

| TAG NAME | FUNCTION |
| --- | --- |
| <message name="msg_BRPSTART"> | This node specifies the return message from UNIX to identify the state of "Brio Report Poller is running". |
| <strategy name="stg_u_fact"> | This node specifies the java class name which implements the factory UNIX operation strategy. |
| <flow> | This sub-node of "<factory_config>" specifies the command flow to the factory operation. The flow is load into the stack by the application during the initialization. |
| <step name=......> | This sub-node of "<flow>" specifies the individual command within the command flow. |
| <mvs_config> | This is a root node of MVS operation configuration block. |
| <param name="param_MVSFLAG"> | This node specifies the flag of MVS run type in input and output file. |
| <command name="mcmd_USERID"> | This node specifies the command to input user id. |
| <command name="mcmd_PASSWD"> | This node specifies the command to input the password. |
| <command name="mcmd_EXIT"> | This node specifies the command to exit the system. |
| <message name="mmsg_CONNPROMPT"> | This node specifies the return message from MVS to identify the state of login success. |
| <message name="mmsg_PASSPROMPT"> | This node specifies the return message from MVS to identify state of password input prompt. |
| <message name="mmsg_LOGSUCCESS"> | This node specifies the return message from MVS to identify the state of login success. |
| <message name="mmsg_LOGFAILED"> | This node specifies the return message from MVS to identify the state of login fail. |
| <strategy name="stg_m_gen"> | This node specifies the java class name which implements the general MVS operation strategy. |
| <comm_config> | This is a root node of the common configuration block. |
| <param name="SCRNSEP"> | This node specifies the screen separator. |
| <param name="SEPLNGTH"> | This node specifies the length of the screen separator. |
| <param name="BPDIR"> | This node specifies the backup directory name. |
| <param name="SECMODE"> | This is a switch between the NORMAL and SECURITY mode, e.g., "true" for SECURITY mode and "false" for NORMAL mode. |
| <param name="KNAME"> | This node specifies the key file name. |
| <param name="EXPDAYS"> | This node specifies expiration days from the generation date. |
| <param name="TPORT"> | This node specifies UNIX port number. |
| <param name="FPORT"> | The port specifies MVS port number. |
| <param name="PWDF"> | This node specifies the input file name. |
| <param name="NPWDF"> | This node specifies the output file name. |
| <param name="LOGDIR"> | This node specifies the log directory name. |
| <param name="FACTHOME"> | This node specifies the factories directory name. |
| <command name="cmd_CONNECT"> | This node specifies the connect command |
| <command name="cmd_DISCONNECT"> | This node specifies the disconnect command |
| <chain> | This is a root node of handler chain |
| <handler name=....> | This node to specifies the java class name of individual handler, which is loaded during the initialization by using Java reflection technology to dynamically construct the chain of responsibility, and implement the component decoupling. |

Log Directory (210)

The log directory 210 contains a log file and error log file. In one example, the name format for the log file is "<timestamp>" and the name format for the error log file is "<timestamp>_err". When the password is generated, it is written to the log file; otherwise, after updating to each ID, the new password is written to the log file. In this manner, the log file provides a double mechanism to provide recovery in the event of a hardware problem function.

Factories Directory (215)

The factories directory 215 is implemented for a factory ID application. In embodiments, the factories directory contains subdirectories having a name format "userid@hostname". Under such subdirectories, there may be two files: ".lwprofile", which is synchronized with ".lwprofile" file in the remote factory host (of the factory application) and ".lwprofile<timestamp>" which is a history file used for disaster recovery.

Backup Directory (220)

The backup directory 200 contains a copy of new passwords file. In embodiments, data which is backed up includes the new passwords file. The tool of the present invention provides two mechanisms to provide the backup and recovery function.

First, after running, the new password file is copied to the backup directory. Because the new password file includes a timestamp as its name, this directory can keep any number of new password files. While the system is restored to the previous image, the password files can be used to restore to previous version.

Second, the tool provides the backup and recovery mechanism to the remote ".lwprofile". Under the factory directory, there are multiple subdirectories named "userid@hostname" in which one file is named ".lwprofile", which is synchronized with the current remote ".lwprofile" file. This provides the remote backup mechanism. Another kind of file is named ".lwprofile<timestamp>" which is the history file to the remote ".lwprofile" file (or local ".lwprofile" file). This file provides the rollback mechanism when there is a disaster.

Bin Directory (225)

The bin directory contains the commands and utilities that the tool uses in implementing the processes of the invention. In the case of UNIX systems, this directory is simply a link to /usr/bin. The bin directory includes the following scripts autoupdate.cmd: this script starts the automation process.
generatekey.cmd: this script generates a key for encryption.
encrypt.cmd: this script is used to encrypt files.
decrypt.cmd: this script is used to decrypt files.

Input File (Old Password File) (230)

This file contains the input data. The name is specified in the configuration file (config.xml). In embodiments, the default name is "passwords".

Output File (New Password File) (235)

The output file 235 contains the output data. In embodiments, the format is the same as the input file but with the newly generated password.

Key File (240)

The key file 240 contains the encryption key used to encrypt and decrypt input files.

Process Flows Implementing Steps of the Invention

Figure 3:
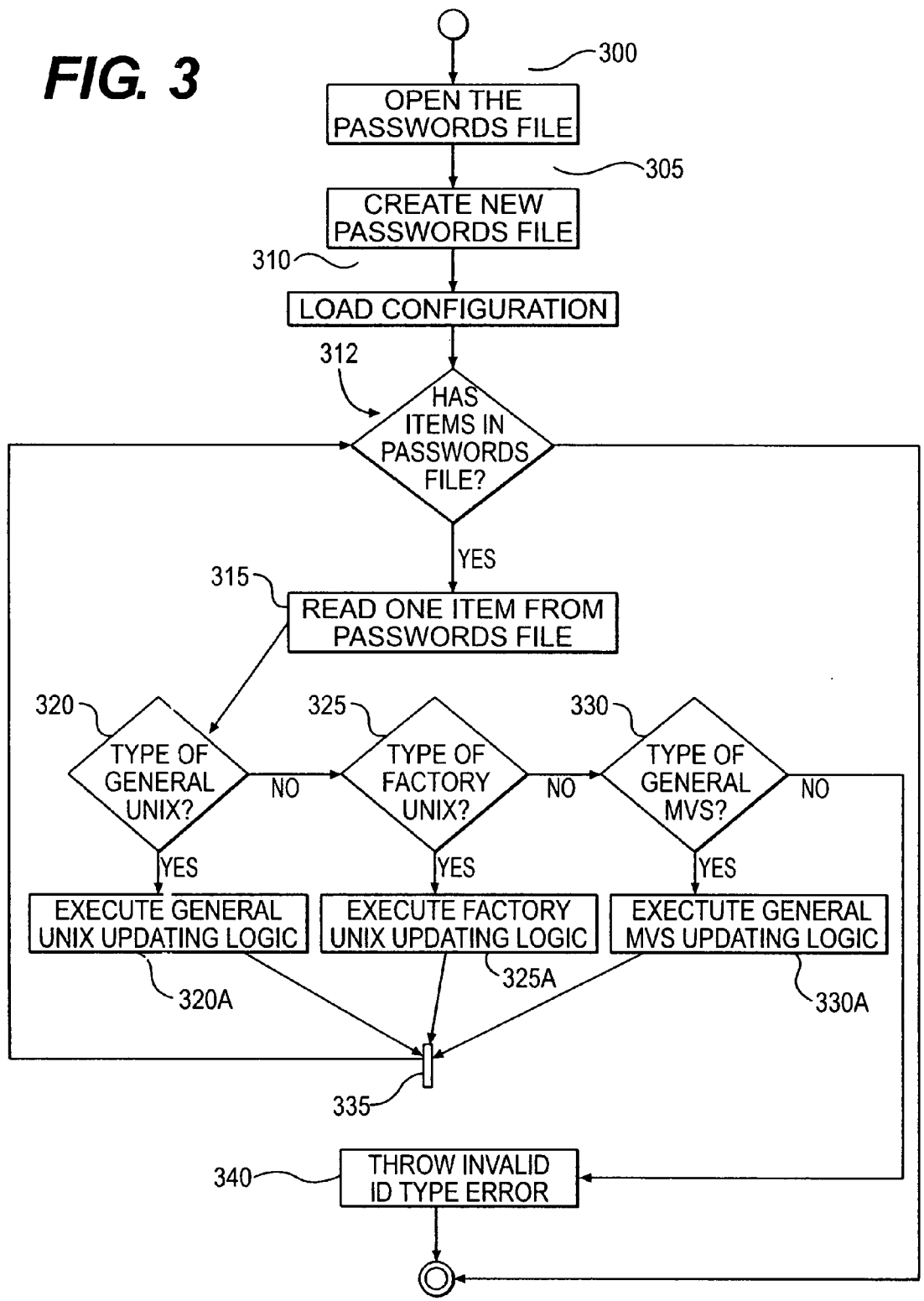
FIGS. 3-7 are flow charts implementing steps of different aspects of the invention.

FIG. 3 is a flow diagram implementing steps of the invention. FIG. 3 (and the remaining flow diagrams) may equally represent a high-level block diagram of the invention. The steps of FIG. 3 (and the remaining flow diagrams) may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

Software elements include but are not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In another embodiment, the invention provides a business method that performs the process steps of the invention on a subscription, advertising, and/or fee basis. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

FIG. 3 represents a top-level logic flow activity in accordance with the invention. At step 300, a password file is opened. This password file may be opened by a librarian on a desktop computing device. At step 305, a new password file is created, i.e., opened. At this stage, the new password file does not contain any newly generated passwords. At step 310, the process of the invention loads the configuration file, as discussed above. The process will, using the configuration file, begin to configure the system for particular applications, as should be understood by those of skill in the art, in view of the above disclosure.

At step 312, a determination is made as to whether there are items in the password file. If there are no items in the password file at step 312, the process ends and no passwords are updated. However, if there are items in the password file, the process continues to step 315. At step 315, the process reads information from the password file. This information may include, but is not limited to, a string comprising user ID, password information, type of user ID (e.g., UNIX, MVS (Multiple Virtual Storage), etc.).

At step 320, a determination is made as to whether the user ID type is for a general UNIX. If so, the system proceeds to step 320A at which stage the process executes the general updating logic. The general updating logic for the general UNIX is described with reference to FIG. 4. At step 335, the process updates (writes) the new password file for the general UNIX userid. This password is placed in the opened password file.

If the user ID is not for a general UNIX, the system proceeds to step 325. At step 325, a determination is made as to whether the user ID type is for a continuously running UNIX application of which an SCPS Factory id is an example. If so, the system proceeds to step 325A, at which stage the process executes the factory UNIX updating logic. The factory UNIX logic is described with reference to FIG. 5. At step 335, the process updates the new password file for the factory UNIX application. This password is placed in the opened password file and the ".lwprofile" file.

If the user ID is not for a factory UNIX, the system proceeds to step 330. At step 330, a determination is made as to whether the user ID type is for a general MVS. If so, the system proceeds to step 330A, at which stage the process executes the MVS updating logic. The MVS logic is described with reference to FIG. 6. At step 335, the process updates the new password file for the MVS application. This password is placed in the opened password file.

It should be recognized that the above example is directed to three applications; however, these same process steps can be implemented with any application, known to those of skill in the art. Accordingly, the process steps of 320-330A should not be considered a limiting feature of the invention, and those of skill in the art should readily understand that the principles described herein can be implemented with other applications. It should further be understood that the decision steps of 320, 325 and 330 may be performed in any order, and that the order of the steps in FIG. 3 is but one illustrative example. It should be recognized that if a valid application is not recognized (e.g., at steps 320, 325 or 330), the process proceeds to step 340. At step 340, an invalid ID type error is generated and the process ends.

Figure 4:
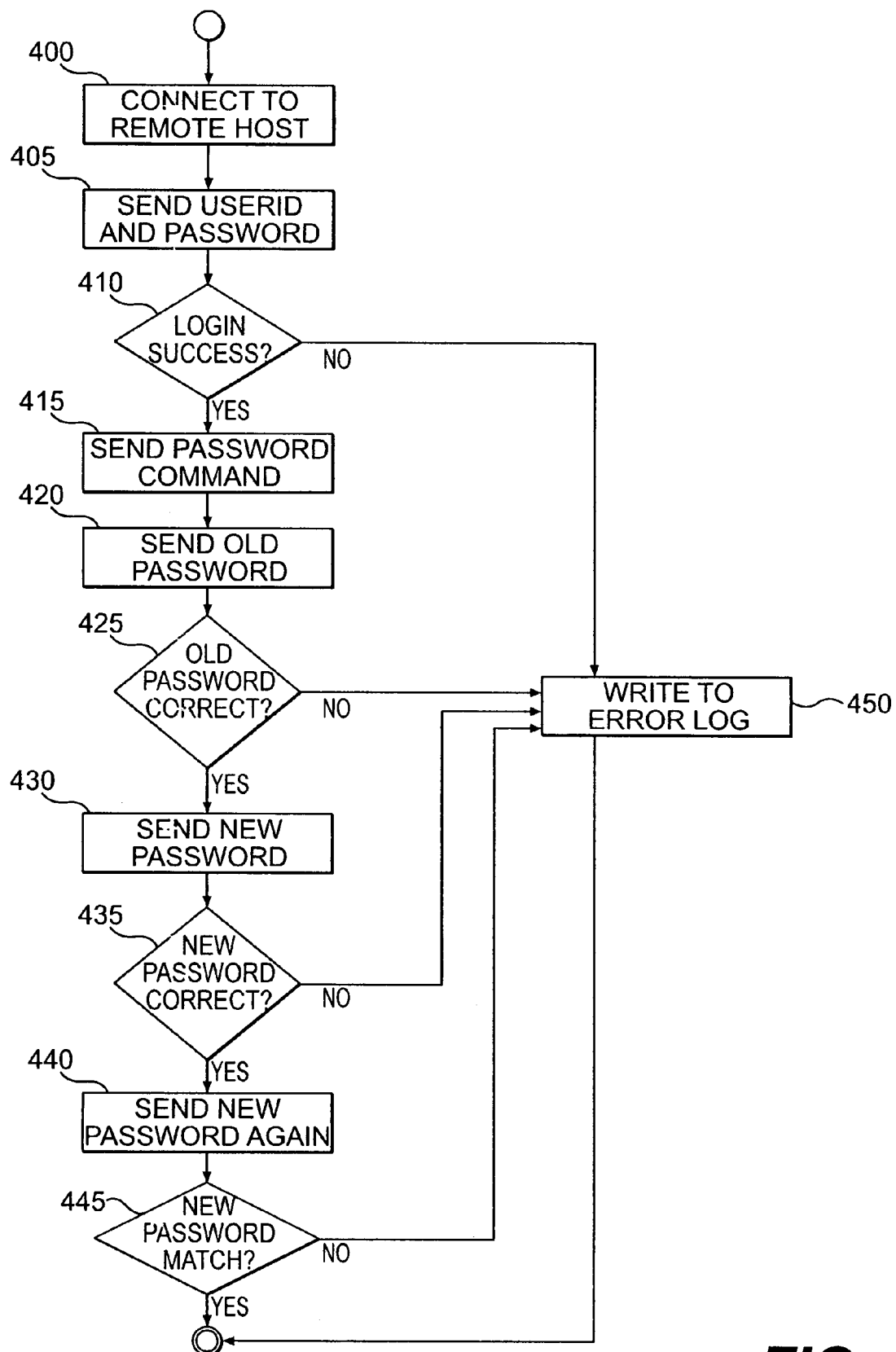

FIG. 4 is a flow chart showing a general UNIX account password-updating process in accordance with the invention. In general, the processes of FIG. 4 are used to automatically update the password for a general UNIX account. At step 400, the process connects to a remote host. At step 405, the process sends a user ID and password to the application. At step 410, a determination is made as to whether the log on has been successful. If not, the process writes to the error log at step 450, and then ends.

If the log on is successful, the process sends the password command at step 415. At step 420, the old password is sent. At step 425, a determination is made as to whether the old password is correct. If not, the process writes to the error log at step 450, and then ends. At step 430, if the password is correct, the process sends a new password, which may be automatically and randomly generated using well known techniques. At step 435, a determination is made as to whether the new password is correct (i.e., meets certain system requirements such as, for example, correct amount of digits, etc.). If not, the process writes to the error log at step 450, and then ends. If the new password is correct, the process will again reenter the new password at step 440. At step 445, a determination is made as to whether the new passwords match. If not, then the process writes to the error log at step 450, and then ends. If the passwords do match, the process then proceeds to step 335 of FIG. 2.

Figure 5:
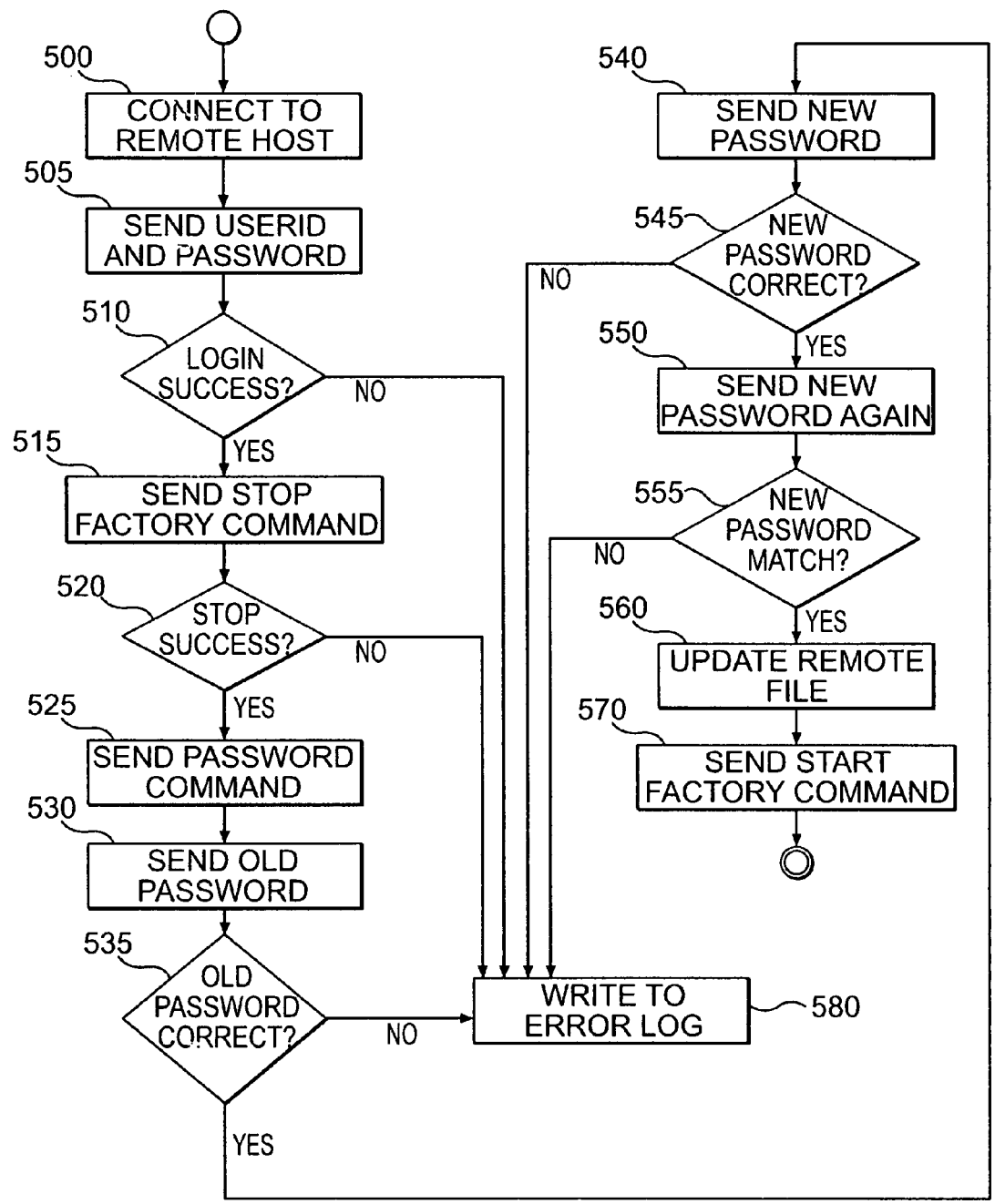

FIG. 5 is a flow chart showing a factory UNIX password account updating process in accordance with the invention. The process steps of FIG. 5 are used to automatically update the password in the factory UNIX account. At step 500, the process connects to a remote host. At step 505, the process sends a user ID and password to the application. At step 510, a determination is made as to whether the log on has been successful. If not, the process writes to the error log at step 580, and then ends.

If the log on is successful, the process sends a stop order to the factory command at step 515. The stop command will shut down the factory and allow the password file to be updated in the factory UNIX account. During this stage, the factory application is off line.

At step 520, a determination is made as to whether the stop command has been successfully executed. If not, the process writes to the error log at step 580, and then ends. If the stop command is successful, a new password command is sent at step 525. At step 530, the old password is sent.

At step 535, a determination is made as to whether the old password is correct. If not, the process writes to the error log at step 580, and then ends. If the password is correct, the process sends a new password, which may be automatically and randomly generated using well known techniques, at step 540. At step 545, a determination is made as to whether the new password is correct (i.e., meets certain system requirements). If not, the process writes to the error log at step 580, and then ends.

If the new password is correct, the process will again reenter the new password at step 550. At step 555, a determination is made as to whether the new passwords match. If not, the process writes to the error log at step 580, and then ends. If the passwords match, the process will then update the remote file (e.g., .lwprofile) with the new password, at step 560. This may be performed via an FTP. The remote file (e.g., .lwprofile) is unique to the factory application on the UNIX server. In embodiments, the factory references the remote file for the user ID and password, as well as other required parameters. The process will send a start command to the factory command at step 570. The process proceeds to step 335 of FIG. 2.

Figure 6:
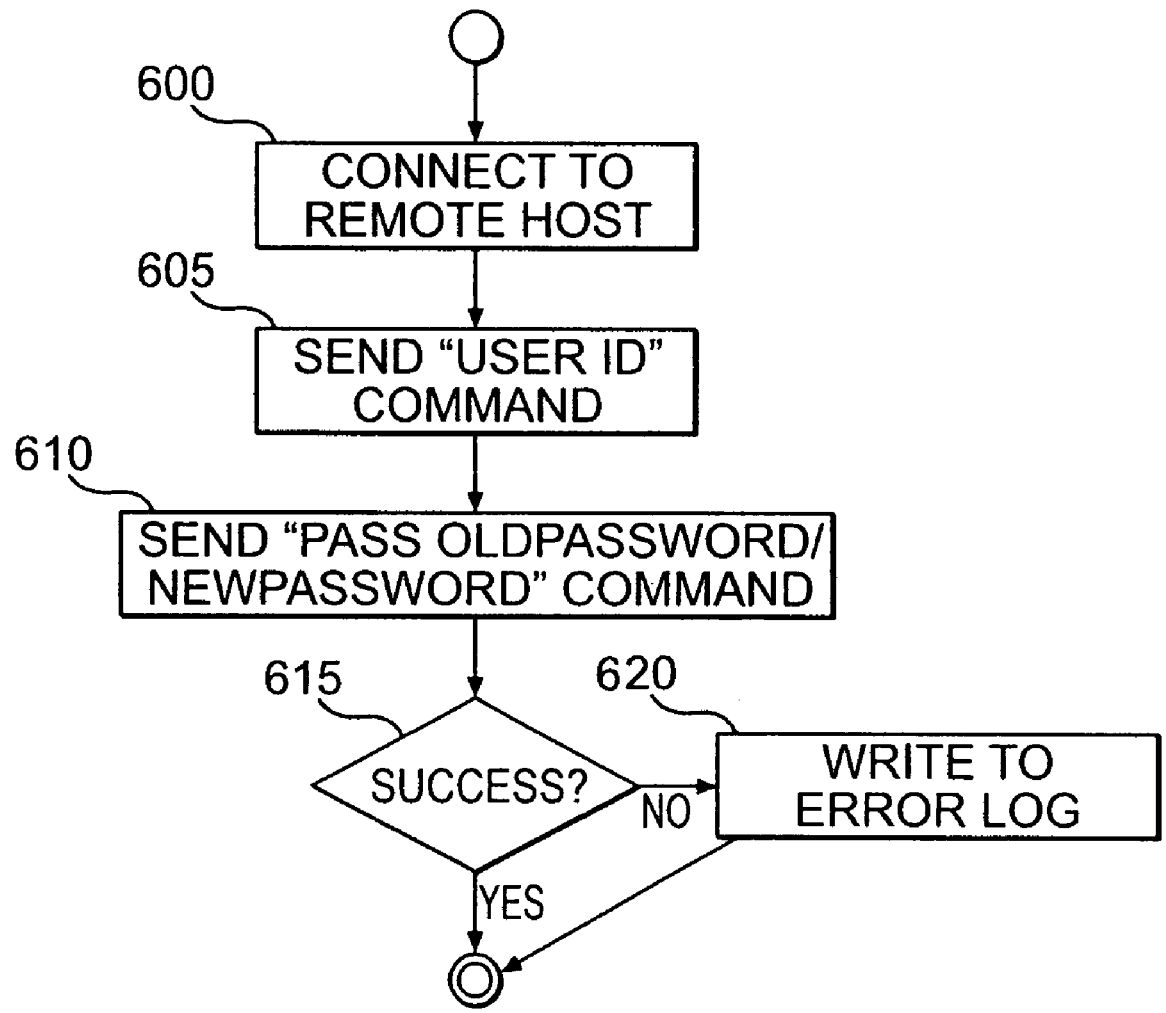

FIG. 6 is a flow chart showing general MVS password account updating in accordance with the invention. The process steps of FIG. 6 are used to update the password in the general MVS system. At step 600, the process connects to a remote host. At step 605, the process sends a user ID and password command to the application. At step 610, the process sends a "pass old password/new password" command. At step 615, a determination is made as to whether the password command has been successful. If not, the process writes to the error log at step 620, and then ends. If the password command was successful, the process proceeds to step 335 of FIG. 2.

Programs and Functions

In embodiments, the system comprises two layers: the communication layer and the business logic layer. The communication layer is used to handle the socket connection, protocol handling and thread handling etc.; whereas, the business logic layer implements the business logic based on the communication layer support. The business logic layer is shown in FIG. 7 and is discussed in more detail below.

The communication layer comprises class names and descriptions as shown in Table 1. The class names may be packaged, using the package names noted in the below table. Those of skill in the art should recognize that the class names and package names are arbitrary names used for purposes of this disclosure and should not be considered limiting features.

TABLE 2

| PACKAGE NAME | CLASS NAME | DESCRIPTION |
| --- | --- | --- |
| com.XXX.tools.pwd.net (XXX represents a company name such as, for example, IBM.) Code from this package may be sourced from the open source consortium; although, it should be recognized that other code may be used to implement the invention. | DefaultSocketFactory | DefaultSocketFactory implements the SocketFactory interface by wrapping java.net.Socket and java.net.ServerSocket constructors. |
| | MalformedServerReply Exception | This exception is used to indicate that the reply from a server could not be interpreted. |
| | ProtocolCommandEvent | A large class of IETF protocols that work by sending an ASCII text command and arguments to a server, and then receiving an ASCII text reply. |
| | ProtocolCommandListener | A class of IETF protocols that work by sending an ASCII text command and arguments to a server, and then receiving an ASCII text reply. |
| | ProtocolCommandSupport | ProtocolCommandSupport is a convenience class for managing a list of ProtocolCommand Listeners and firing Protocol CommandEvents. |
| | SocketClient | The SocketClient provides the basic operations that are required of client objects accessing sockets. |
| | SocketFactory | The SocketFactory interface provides a mechanism for the programmer to control the creation of sockets and provide Socket implementations |
| com.XXX.tools.pwd.net.ftp Code from this package may be sourced from the open source consortium; although, it should be recognized that other code may be used to implement the invention. | Configurable | This interface adds the aspect of configurability by means of a supplied FTPClientConfig object to other classes in the system, listing parsers. |
| | DefaultFTPFileListParser | DefaultFTPFileListParser is used to parse file listings. |
| | FTP | FTP provides the basic the functionality necessary to implement a user's own FTP client. |
| | FTPClient | FTPClient encapsulates the functionality necessary to store and retrieve files from an FTP server. |
| | FTPClientConfig | This class implements an alternate mechanism of configuring the "com.XXX.tools.pwd.net.ftp.FTPClient" object and also subordinate objects which it uses. |
| | FTPCommand | FTPCommand stores a set of constants for FTP command codes. |
| | FTPConnectionClosed Exception | FTPConnectionClosed Exception is used to indicate the premature or unexpected closing of an FTP connection |

TABLE 2-continued

| PACKAGE NAME | CLASS NAME | DESCRIPTION |
|---|---|---|
| | | resulting from a "com.XXX.tools.pwd.net.ftp.-FTPReply#SERVICE_NOT_AVAILABLE FTPReply.SERVICE_NOT_AVAILABLE" response (FTP reply code 421)" to a failed FTP command. |
| | FTPFile | The FTPFile class is used to represent information about files stored on an FTP server. |
| | FTPFileEntryParser | FTPFileEntryParser defines the interface for parsing a single FTP file listing and converting that information into a "com.XXX.tools.pwd.net.ftp.FTPFile" instance. |
| | FTPFileEntryParserImpl | This abstract class implements both the older FTPFileListParser and newer FTPFileEntryParser interfaces with default functionality. The classes in the parser subpackage inherit from this. |
| | FTPFileIterator | This class implements a bidirectional iterator over an FTPFileList. |
| | FTPFileList | This class encapsulates a listing of files from an FTP server. |
| | FTPFileListParser | FTPFileListParser defines the interface for parsing FTP file listings and converting that information into an array of "com.XXX.tools.pwd.net.ftp.FTPFile" instances. |
| | FTPFileListParserImpl | This abstract class implements both the older FTPFileListParser and newer FTPFileEntryParser interfaces with default functionality. The classes in the parser subpackage inherit from this. |
| | FTPListParseEngine | This class handles the entire process of parsing a listing of file entries from the server. |
| | FTPReply | FTPReply stores a set of constants for FTP reply codes. |
| | PrintCommandListener | It is an implementation of the ProtocolCommand Listener interface which prints out to a specified stream all command/reply traffic. |
| com.XXX.tools.pwd.net.ftp.parser Code from this package may be sourced from the open source consortium; although, it should be recognized that other code may be used to implement the invention. | CompositeFileEntryParser | This implementation allows to pack some FileEntryParsers together and handle the case where to returned dir style is not clearly defined. The matching parser will be cached. |
| | ConfigurableFTPFileEntry ParserImpl | This abstract class implements the common timestamp parsing |

TABLE 2-continued

| PACKAGE NAME | CLASS NAME | DESCRIPTION |
|---|---|---|
| | | algorithm for all the concrete parsers. |
| | DefaultFTPFileEntryParserFactory | This is the default implementation of the FTPFileEntryParserFactory interface. |
| | EnterpriseUnixFTPEntryParser | This is the parser for the Connect Enterprise Unix FTP Server. |
| | FTPFileEntryParserFactory | This interface describes a factory for creating FTPFileEntryParsers. |
| | FTPTimestampParser | This interface specifies the concept of parsing an FTP server's timestamp. |
| | FTPTimestampParserImpl | Default implementation of the "FTPTimestampParser" interface also implements the com.XXX.tools.pwd.net.ftp.Configurable" interface to allow the parsing to be configured from the outside. |
| | MVSFTPEntryParser | Implementation of FTPFileEntryParser and FTPFileListParser for MVS Systems. |
| | NTFTPEntryParser | Implementation of FTPFileEntryParser and FTPFileListParser for NT Systems. |
| | ParserInitializationException | This class encapsulates all errors that may be thrown by the process of an FTPFileEntryParser Factory creating and instantiating an FTPFileEntryParser. |
| | RegexFTPFileEntryParserImpl | This is the base for regular based FTPFileEntryParser. |
| | UnixFTPEntryParser | Implementation FTPFileEntryParser and FTPFileListParser for standard Unix Systems. |
| | VMSFTPEntryParser | Implementation FTPFileEntryParser and FTPFileListParser for VMS Systems. |
| | VMSVersioningFTPEntryParser | implementation VMSFTPEntryParser with versioning turned on. |
| com.XXX.tools.pwd.net.io Code from this package may be sourced from the open source consortium; although, it should be recognized that other code may be used to implement the invention. | CopyStreamEvent | A CopyStreamEvent is triggered after every write performed by a stream copying operation. The event stores the number of bytes transferred by the write triggering the event as well as the total number of bytes transferred so far by the copy operation. |
| | CopyStreamException | The CopyStreamException class is thrown by org.apache.commons.io.Util copyStream( ) methods. It stores the number of bytes confirmed to have been transferred before an I/O error as well as the IOException responsible |

TABLE 2-continued

| PACKAGE NAME | CLASS NAME | DESCRIPTION |
| --- | --- | --- |
| | | for the failure of a copy operation. |
| | CopyStreamListener | The CopyStreamListener class can accept CopyStreamEvents to keep track of the progress of a stream copying operation. |
| | FromNetASCIIInputStream | This class wraps an input stream, replacing all occurrences of <CR><LF> (carriage return followed by a linefeed), which is the NETASCII standard for representing a newline, with the local line separator representation. This class is used to implement ASCII file transfers requiring conversion from NETASCII. |
| | SocketInputStream | This class wraps an input stream, storing a reference to its originating socket. When the stream is closed, it will also close the socket afterward. |
| | SocketOutputStream | This class wraps an output stream, storing a reference to its originating socket. When the stream is closed, it will also close the socket immediately afterward. |
| | ToNetASCIIOutputStream | This class wraps an output stream, replacing all singly occurring <LF> (linefeed) characters with <CR><LF> (carriage return followed by linefeed), which is the NETASCII standard for representing a newline. |
| | Util | The Util class stores short static convenience methods. |
| com.XXX.tools.pwd.net.TELNET | EchoOptionHandler | Implements the TELNET echo option RFC 857. |
| Code from this package may be sourced from the open source consortium; although, it should be recognized that other code may be used to implement the invention. | InvalidTELNETOptionException | The InvalidTELNETOption Exception is the exception that is thrown whenever a TELNETOptionHandler with an invalid option code is registered in TELNETClient with addOptionHandler. |
| | SimpleOptionHandler | This is a simple option handler that can be used for options that do not require ubnegotiation. |
| | SuppressGAOptionHandler | Implements the TELNET suppress go ahead option RFC 858. |
| | TELNET | |
| | TELNETClient | The TELNETClient class implements the simple network virtual terminal |

TABLE 2-continued

| PACKAGE NAME | CLASS NAME | DESCRIPTION |
|---|---|---|
| | | (NVT) for the TELNET protocol according to RFC 854. |
| | TELNETCommand | The TELNETCommand class cannot be instantiated and only serves as a storehouse for TELNET command constants. |
| | TELNETInputStream | |
| | TELNETNotificationHandler | The TELNETNotificationHandler interface can be used to handle notification of options negotiation commands received on a TELNET session. |
| | TELNETOption | The TELNETOption class cannot be instantiated and only serves as a storehouse for TELNET option constants. |
| | TELNETOptionHandler | The TELNETOptionHandler class is the base class to be used for implementing handlers for TELNET options. |
| | TELNETOutputStream | |
| | TerminalTypeOptionHandler | Implements the TELNET terminal type option RFC 1091. |
| com.XXX.tools.pwd.net.util Code from this package may be sourced from the open source consortium; although, it should be recognized that other code may be used to implement the invention. | ListenerList | |

The business layer comprises three main domains: the strategy domain, the state domain and the handler domain. These domains are discussed, individually, below.

Strategy Domain

The strategy domain follows a strategy pattern. In embodiments, a strategy poller dynamically selects the strategy (e.g., factory UNIX application, etc.) in order to implement miscellaneous operations following a run type parameter. In implementations, each strategy object concerns different operation logic, with the strategy class names written in the configuration file under a "<strategy>" tag. During initialization, the system loads the class names, reflects them to instance and constructs the strategy pool, which is utilized by the strategy poller. Such architecture promotes extensibility and loose coupling.

State Domain

The state domain follows the state machine pattern and keeps track of the state of the system during run time. Other domains can also use these states.

Handler Domain

The handler domain follows a "chain of responsibility" pattern. For example, each handler is concerned with how to handle individual or multiple commands according to the current state and their responsibility. The handler names are written in the configuration file to be dynamically loaded during the initialization. By using Java® reflection technology, the handler names are reflected into handler instances, constructed into a handler chain, where the commands can be passed through the chain to be handled.

Figure 7:
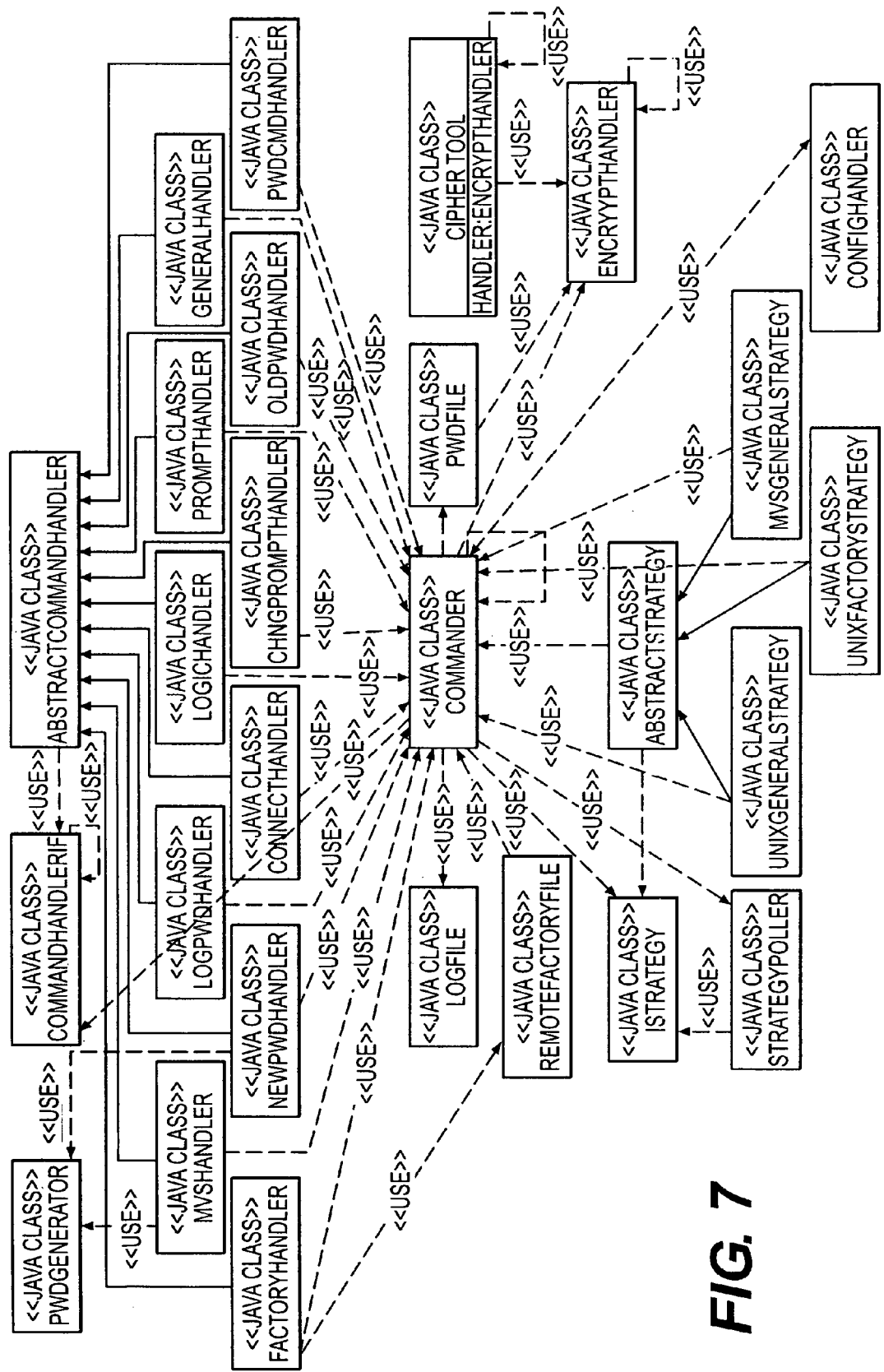

By way of more specific example, FIG. 7 shows a class diagram for the business logic layer implemented in accordance with the invention. The business logic layer comprises, as discussed in detail in Table 2, class names and descriptions. The class names may be packaged, using the package names noted in the below table. Again, those of skill in the art should recognize that the class names and package names are arbitrary names used for purposes of this disclosure and should not be considered limiting features.

TABLE 3

| PACKAGE NAME | CLASS NAME | DESCRIPTION |
|---|---|---|
| com.XXX.tools.pwd.logic.handlers | AbstractCommandHandler | This is an abstract parent class for command handlers. |

TABLE 3-continued

| PACKAGE NAME | CLASS NAME | DESCRIPTION |
|---|---|---|
| | ChngPromptHandler | This is a handler to handle change prompt command. |
| | CommandHandlerIF | This is a common interface for the handlers, it used as contract. |
| | ConnectHandler | This is a handler to handle the connect command. |
| | EncryptHandler | This is a handler to handle the encrypted stream. |
| | FactoryHandler | This is a handler to handle the UNIX factory operation command sequence. |
| | GeneralHandler | This is a handler to handle all unhandled commands. This hander is used as the terminator of the handler chain. |
| | LogFile | This is a log file wrapper. |
| | LogIdHandler | This is a Unix login id command handler. |
| | LogPwdHandler | This is a UNIX login password command handler. |
| | MvsHandler | This is a handler to handle the MVS command sequence. |
| | NewPwdHandler | This is a handler to handle the new password command. |
| | OldPwdHandler | This is a handler to handle the old password command. |
| | PromptHandler | This is a handler to handle the prompt command. |
| | PwdCmdHandler | This is a handler to handle the change password command. |
| | PwdFile | This is a password file (input and output file) wrapper. |
| | PwdGenerator | This is a password generator. |
| | RemoteFactoryFile | This is a remote factory file wrapper. |
| com.XXX.tools.pwd.logic.main | Commander | This is a main entry of the application and state machine object. |
| | ConfigHandler | This is a SAX parser of the configuration file. |
| | CipherTool | This is an entry to the encryption and decryption operations. |
| com.XXX.tools.pwd.logic.strategies | AbstractStrategy | This is an abstract parent class for the strategy objects. |
| | Istrategy | This is a common interface for the strategy objects. |
| | MvsGeneralStrategy | This is a strategy or command flow for the general MVS operation. |
| | StrategyPoller | This is a poller to the strategy objects. The poller dynamically polls the strategy objects. |

TABLE 3-continued

| PACKAGE NAME | CLASS NAME | DESCRIPTION |
| --- | --- | --- |
| | UnixFactoryStrategy | This is a strategy or command flow for the UNIX factory operation. |
| | UnixGeneralStrategy | This is a strategy or command flow for the UNIX general operation. |

Event Flow and Error Processing

The following is representative of user steps for implementing aspects of the invention.
Main Flow
  <<Copy the text format passwords file into "%INSTALL_HOME%" directory, change the value of "<param name="SECMODE">" to false in "config.xml".
  <<Open the command console, Navigate to the "%INSTALL_HOME%\bin" in the command console.
  <<Launch the script "autoupdate.cmd".
  <<Monitor the progress.
  <<Until finished, navigate to "%INSTALL_HOME%\log" directory.
  <<Check the "<timestamp>_err" file.
    IF "invalid login name or password." error, perform Error Flow1.
    E_IF "too many unsuccessful login attempts;" error, perform Error Flow2.
    E_IF other error (such as network problem), perform Error Flow3.>>
  <<IF come back from Error flow.
    Delete all of the error items in the newpasswords file.
    Organize the error items into a new input file.
    Go back to the Launch the script "autoupdate.cmd".
    Combine the all newpasswords file with different timestamp as the input file for the next cycle of running.>>
  <<Go to Manual Encrypting Flow.
  <Back up the encrypted newpasswords file and the key to other location than the librarian's workstation. In embodiments, It is recommended to put these two files in the different location separately.
Manual Encrypting Flow
  <<Navigate to the %INSTALL_HOME% in the windows explorer.>>
  <<Open the command console.>>
  <<Move the new password file to .%INSTALL_HOME%.>>
  <<Perform command "generatekey %destination_path%" to generate a key.>>
  <<Perform command "encrypt %newpasswordsfile_path% %destination_path% %key_path%" to encrypt the new passwords file.>>
  <<Move the key and the encrypted new password file to secure location, and delete the text new password file.>>
  <<End use case.>>
Manual Decrypting Flow
  <<Navigate to the %INSTALL_HOME% in the windows explorer.>>
  <<Open the command console.>>
  <<Move the key and the encrypted new password file to % INSTALL_HOME%.>>
  <<Perform the command "decrypt %encryptednewpasswordsfile_path% %destination_path% %key_path%" to decrypt the new passwords file.>>
  <<End use case.>>
Error Flow1
  <<Navigate to the %INSTALL_HOME% in the windows explorer.>>
  <<Open the old passwords file in a text editor.>>
  <<Find out the stop point.>>
  <<Delete the finished items in the old password file.>>
  <<Save the rest items in the old password file as input passwords file.>>
  <<Manually solve the userid or password problem.>>
  <<Go to Main Flow: <<Check the "<timestamp>_err" file.>>
Error Flow2
  <<Navigate to the %INSTALL_HOME% in the windows explorer.>>
  <<Open the old passwords file in a text editor.>>
  <<Find out the stop point.>>
  <<Delete the finished items in the old passwords file.>>
  <<Save the remaining items in the old password file as the input passwords file.>>
  <<Manually reset the password.>>
  <<Go to Main Flow: <<Check the "<timestamp>_err" file.>>
Error Flow3
  <<Navigate to the %INSTALL_HOME% in the windows explorer.>>
  <<Open the old passwords file in a text editor.>>
  <<Find out the stop point.>>
  <<Delete the finished items in the old password file.>>
  <<Save the remaining items in the old password file as input passwords file.>>
  <<Manually solve the problem.>>
  <<Go to Main Flow: <<Check the "<timestamp>_err" file.>>

Security Considerations

The tool is run on a librarian's desktop and, in embodiments, all the activities may be behind a firewall. In one implementation, a security consideration would be the password file protection. This tool can run in two modes: normal mode and security mode. In NORMAL mode, the passwords and new passwords file are plain text format. This mode can provide a manual encryption function (e.g., DESede 168-bit), which the librarian may manually execute. In the SECURITY mode, the passwords file and the new passwords file are provided in an encrypted format (e.g., DESede 168-bit). In the SECURITY mode, the librarian will decrypt the encrypted passwords file before editing, by use of a manual encryption tool. After running, the librarian will move the encrypted file to a secure location, where the separation of the encrypted new password file and the key is recommended.

Performance Considerations

There are few performance issues to this tool with a single user. The tool uses JAVA™ reflection technology to dynamically instantiate the strategy object and handler object. This mechanism may introduce some performance bottleneck. The tool can finish the reflection operation during the initiation phase to escape such bottleneck.

While the invention has been described in terms of embodiments, those skilled in the art will recognize that the invention can be practiced with modifications and in the spirit and scope of the appended claims.

What is claimed is:

1. A method of auto updating a password, comprising:
opening a password file and a new password file;
reading information from the password file including a user ID account type; and
determining whether the user ID account type matches a predetermined application account type;
when the user ID account type matches the predetermined application account type:
executing password updating logic to generate a new password for the predetermined application account type; and
updating the new password file with the new password for the predetermined application account type, wherein the predetermined application account type is at least one of a plurality of predetermined application account types comprising a general UNIX account, a factory UNIX account and a general MVS (Multiple Virtual Storage) account; and
the user ID account type is one of a plurality of predetermined user ID account types comprising the general UNIX account, the factory UNIX account, the general MVS account, and an invalid account.

2. The method of claim 1, wherein the steps of claim 1 simulate manual TELNET operations.

3. The method of claim 1, wherein the new password file does not contain any newly generated passwords prior to the updating.

4. The method of claim 1, wherein the password updating logic is at least one of a general updating logic for a general UNIX account or MVS Account and executing pre or post password change logic to support password changes on a running application.

5. The method of claim 4, further comprising:
sending a password command and current password to the general UNIX account; and
sending the new password to the general UNIX account.

6. The method of claim 5, further comprising determining that the current password is correct.

7. The method of claim 6, further comprising:
determining that the new password is correct and reentering the new password;
determining that the new password and the reentered new password match; and
updating the new password file.

8. The method of claim 4, further comprising executing the pre or post password change functions to support an associated application, the executing comprising sending a stop command to a factory of the factory UNIX account and determining that the stop command has been successfully executed.

9. The method of claim 8, further comprising:
sending a new password command and a current password to the UNIX or MVS account;
determining that the current password is correct; and
sending the new password.

10. The method of claim 9, further comprising determining that the new password is correct and reentering the new password.

11. The method of claim 10, further comprising:
determining that the new password and the reentered new password match;
updating the new password file; and
updating a remote file with the new password upon a determination that the new password and the reentered new password match; and
sending a start command to the factory UNIX account.

12. The method of claim 4, further comprising sending and verifying a successful send of a "pass old password/new password" command, and updating the new password file with the new password.

13. The method of claim 1, further comprising determining that there are no items in the password file and generating an invalid ID type error.

14. The method of claim 1, wherein the information includes a string comprising a user ID, password information and the user ID account type.

15. The method of claim 1, wherein the steps of claim 1 are provided by a service provider.

16. The method of claim 1, wherein the service provider creates, maintains and supports a computer infrastructure that performs the steps of claim 1.

17. The method of claim 1, wherein the steps of claim 1 are provided on at least one of a subscription, advertising, and fee basis.

18. The method of claim 1, further comprising encrypting the new password file.

19. The method of claim 1, wherein the new password file is generated in a same format as an original password file and is prepended with a date on which the new password will expire.

20. The method of claim 1, further comprising time stamping the new password file and providing a backup for the new password file.

21. The method of claim 1, further comprising automatically and randomly generating the new password.

22. The method of claim 1, further comprising writing to an error log when the password updating logic is unsuccessful in generating the new password for the predetermined application account type.

23. A method for deploying an application for updating passwords, comprising:
providing a computer infrastructure being operable to:
read information from a password file including a user ID account type; and
determine whether the user ID account type matches a predetermined application account type;
when the user ID account type matches the predetermined application account type:
generate a new password for the predetermined application account type;
update data on a server with the new password for a user ID; and
update the password file with the new password for the predetermined application account type, wherein the predetermined application account type is at least one of a plurality of predetermined application account types comprising a general UNIX account, a factory UNIX account and a general MVS (Multiple Virtual Storage) account; and the user ID account type is one of a plurality of predetermined user ID account types comprising the general UNIX account, the factory UNIX account, the general MVS account, and an invalid account.

24. The method of claim 23, wherein the computer infrastructure is operable to automatically and randomly generate the new password.

25. The method of claim 23, wherein the computer infrastructure is operable to:
send a password command and current password to a general UNIX account;
determine that the current password and a newly generated password are correct; and
send the current and newly generated password to the general UNIX account.

26. The method of claim 25, wherein the computer infrastructure is operable to:
determine that the new password is correct;
reenter the new password; and
determine that the new password and the reentered new password match.

27. The method of claim 23, wherein the computer infrastructure is operable to execute pre or post password change functions for a given account type.

28. The method of claim 27, wherein the computer infrastructure is operable to:
determine that a given command has been successfully executed;
send a new password command and a current password to the factory UNIX account;
determine that the current password is correct;
send and verify correctness of the new password; and
update a remote file with the new password.

29. The method of claim 28, wherein the computer infrastructure is operable to send a start command to the factory UNIX account.

30. The method of claim 23, wherein the computer infrastructure is operable to determine that there are no items in the password file and generate an invalid ID type error.

31. The method of claim 23, wherein the computer infrastructure is at least one of created, maintained and supported by a service provider on at least one of a subscription, advertising, and fee basis.

32. The method of claim 23, wherein the new password file is generated in a same format as an original password file and is prepended with a date on which the password in the new password file will expire.

33. The method of claim 23, further comprising writing to an error log when the generating of the new password for the predetermined application account type is unsuccessful.

34. A system implemented in hardware, comprising:
a processor configured to:
read information from a password file including a user ID account type;
determine whether the user ID account type matches a predetermined application account type;
when the user ID account type matches the predetermined application account type:
generate a new password for the predetermined application account type;
update data on a server with the new password for a user ID; and
update the password file with the new password for the predetermined application account type, wherein the predetermined application account type is at least one of a plurality of predetermined application account types comprising a general UNIX account, a factory UNIX account and a general MVS (Multiple Virtual Storage) account; and
the user ID account type is one of a plurality of predetermined user ID account types comprising the general UNIX account, the factory UNIX account, the general MVS account, and an invalid account.

35. The system of claim 34, wherein the at least one of a hardware component and a software component is configured to connect to a remote host and send a user ID and password to at least one of the general UNIX account, factory UNIX account and general MVS account.

36. The system of claim 35, wherein the at least one of a hardware component and a software component is configured to:
send a password command and current password to the general UNIX account;
determine that the current password and the new password are correct;
send the current and new password to the general UNIX account;
update a server with the new password for a user ID; and
update a new password file with the new password.

37. The system of claim 34, wherein the at least one of a hardware component and a software component is configured to send a stop and restart command to the factory UNIX account.

38. The system of claim 37, wherein the at least one of a hardware component and a software component is configured to:
determine that the stop order command has been successfully executed;
send the new password command and a current password to the factory UNIX account;
update a remote file with the new password; and
send the start command to the factory UNIX account.

39. The system of claim 38, wherein the at least one of a hardware component and a software component is configured to determine that the current password is correct; and the new password and a reentry of the new password match.

40. The system of claim 34, wherein the at least one of a hardware component and a software component is configured to send a "pass old password/new password" command to the MVS account, determine that the command has been successfully sent and, if so, update the new password file with the new password.

41. The system of claim 34, wherein the at least one of a hardware component and a software component is configured to determine that there are no items in the password file and to generate an invalid ID type error.

42. The system of claim 34, wherein the at least one of a hardware component and a software component is at least one of created, maintained and supported by a service provider on at least one of a subscription, advertising, and fee basis.

43. The system of claim 34, wherein the at least one of a hardware component and a software is configured to generate the new password in a same format as an original password and prepend the new password with a date on which the new password will expire.

44. The system of claim 34, wherein the at least one of a hardware component and a software is configured to encrypt the new password.

45. The system of claim 34, wherein the at least one of a hardware component and a software is configured to backup the new password.

46. The system of claim 34, wherein the at least one of a hardware component and a software is configured to automatically and randomly generate the new password.

47. A computer program product comprising a non-transitory tangible computer usable storage medium having readable program code embodied in the storage medium, the computer program product includes at least one component operable to:
- open a password file and a new password file;
- read information from the password file including a user ID account type;
- determine whether the user ID account type matches a predetermined application account type;
- when the user ID account type matches the predetermined application account type:
  - execute password updating logic to generate a new password for the predetermined application account type;
  - update a server with the new password for a user ID; and
  - update the new password file with the new password for the predetermined application account type, wherein the predetermined application account type is at least one of a plurality of predetermined application account types comprising a general UNIX account, a factory UNIX account and a general MVS (Multiple Virtual Storage) account; and
- the user ID account type is one of a plurality of predetermined user ID account types comprising the general UNIX account, the factory UNIX account, the general MVS account, and an invalid account.

48. The computer program product of claim 47, wherein the at least one component is further operable to write to an error log when the password updating logic is unsuccessful in generating the new password for the predetermined application account type.

* * * * *